(12) United States Patent
Lu

(10) Patent No.: US 8,257,005 B2
(45) Date of Patent: Sep. 4, 2012

(54) CASING WITH A METALLIC SHEET AND A SCREW SEALING AN EXTRUDED TAPPED HOLE IN THE METALLIC SHEET

(75) Inventor: Tung-Ke Lu, Taipei (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 70 days.

(21) Appl. No.: 12/788,870

(22) Filed: May 27, 2010

(65) Prior Publication Data

US 2011/0101834 A1 May 5, 2011

(30) Foreign Application Priority Data

Oct. 29, 2009 (TW) .............................. 98136760 A

(51) Int. Cl.
*F16B 23/00* (2006.01)
(52) U.S. Cl. ........................................ 411/399; 411/378
(58) Field of Classification Search ........................ None
See application file for complete search history.

(56) References Cited

U.S. PATENT DOCUMENTS

| 350,231 | A | * | 10/1886 | Brown | 411/399 |
| 789,107 | A | * | 5/1905 | Steele | 198/860.2 |
| 2,764,053 | A | * | 9/1956 | Lovisek | 411/399 |
| 3,512,446 | A | * | 5/1970 | Sekhon | 411/399 |
| 4,815,907 | A | * | 3/1989 | Williamson et al. | 411/107 |
| 6,149,363 | A | * | 11/2000 | March | 411/366.1 |
| 6,974,290 | B2 | * | 12/2005 | Pountney | 411/384 |
| 2002/0106260 | A1 | * | 8/2002 | Schenk | 411/399 |

* cited by examiner

*Primary Examiner* — Gary Estremsky
(74) *Attorney, Agent, or Firm* — Chun-Ming Shih

(57) ABSTRACT

A casing includes a metallic sheet and a screw. The metallic sheet is formed with an extruded tapped hole surrounded by an arcuate portion in the metallic sheet and a sleeve integrally with and depending from the arcuate portion. The sleeve has internal threads. On the other hand, the screw is configured to seal the extruded tapped hole of the metallic sheet. The screw has a threaded section configured to be mated with the internal threads of the sleeve of the metallic sheet, and a flat head capable of abutting against the arcuate portion and sitting flush with the metallic sheet when the screw is placed in the extruded tapped hole of the metallic sheet.

6 Claims, 7 Drawing Sheets

CASING WITH A METALLIC SHEET AND A SCREW SEALING AN EXTRUDED TAPPED HOLE IN THE METALLIC SHEET

BACKGROUND OF INVENTION

1. Field of Invention

The present invention generally relates to a casing with a metallic sheet and a screw adapted to seal a reserved hole of the metallic sheet, and in particular to a casing with a metallic sheet and a screw capable of sitting flush with the metallic sheet when placed in a reserved hole of the metallic sheet.

2. Related Prior Art

With the rapid development of computer technology, the need to add a new component in a computer host (or a server) is increased as time goes by. To meet this demand, the computer casing in which reserved holes are formed therein is frequently used in practice so that a new component can be then installed in the computer casing via the related reserved hole. However, before mounting of new components, the reserved holes have to be temporarily sealed.

Traditionally, screws are commonly used to seal the reserved holes of the casing before the holes are used. As shown in FIG. 5, a conventional screw 2 has a head 20 much greater than the size of a reserved hole 10 defined in a metallic sheet 1 of the casing. The reserved hole 10 is usually an extruded tapped hole which is generally a hole defined in a sheet with a burred edge formed around the hole and a screw thread tapped in the burr. When the screw 2 is inserted into the reserved hole 10 of the metallic sheet 1, the head 20 of the screw 2 is undesirably blocked outside the metallic sheet 1, as depicted in FIG. 6, and therefore spoils the appearance of the casing.

Referring to FIG. 7, countersink screws 3 are selected to fill up reserved holes 31 in the metallic sheet 1 of the casing. It should be noted that the head 30 of the countersink screw 3 is with flat outer face and tapering inner face allowing it to sink into the material. Likewise, the reserved holes 31, also known as countersinks, are formed from a preformed extruded tapped hole and further processed to include the top conical part enlarged so that the countersink screws 3 will fit into the reserved holes 31 and lie below the top surface of the metallic sheet 1, as depicted in FIG. 8. The combination of countersink screws 30 and the countersink 31 improves the appearance of the casing; however, the cost for processing such a countersink is relatively higher.

Referring to FIGS. 9 and 10, grub screws 4, generally fully threaded and headless, are selected to seal the reserved hole 10, namely the extruded tapped hole, in the metallic sheet 1 of the casing. However, without a head, the grub screw 4 might easily be driven out of the extruded tapped hole 10 and fall from the metallic sheet 1 under excessive rotation by an electric tool. Thus, it is quiet inconvenient for users.

SUMMARY OF INVENTION

Broadly stated, the present invention is directed to a casing comprising a metallic sheet and a screw. The metallic sheet is formed with an extruded tapped hole surrounded by an arcuate portion in the metallic sheet and a sleeve integrally with and depending from the arcuate portion. The sleeve is tapped to have internal threads. On the other hand, the screw is configured to be fitted in the extruded tapped hole of the metallic sheet and has a threaded section and a flat head. The threaded section of the screw is configured to be mated with the internal threads of the sleeve of the metallic sheet. The flat head of the screw is configured to be able to abut against the arcuate portion and sit flush with the metallic sheet when the screw is placed in the extruded tapped hole of the metallic sheet.

Preferably, the screw further includes an unthread neck disposed between the flat head and the threaded section. Further, the screw defines a recess in the flat head and the unthread neck to be driven by a screwdriver.

The construction of casing as described above is thus far largely conventional. According to the present invention, a well-known extruded tapped hole in a metallic sheet is perfectly utilized and a screw with distinctive head is employed to be accepted by the extruded tapped hole. Specifically, the extruded tapped hole with the arcuate portion and the sleeve as described above is generally formed by a punching process with a screw thread tapped in the sleeve, and is easily achieved by prior art techniques. In addition, the flat head of the screw is particularly shaped to be mated with the arcuate portion of the metallic sheet such that when the screw is placed in the extruded tapped hole of the metallic sheet, the flat head of the screw abuts against the arcuate portion and sits flush with the metallic sheet. By this way, the extruded tapped hole does not have to be further processed to form an upper conical enlarged part as in the countersink 31, as depicted in FIG. 7 or 8. Therefore, this configuration is advantageously utilized to form a pleasing casing in a cost-effective way.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which.

DETAILED DESCRIPTION OF PREFERRED EMBODIMENT

Figure 1:
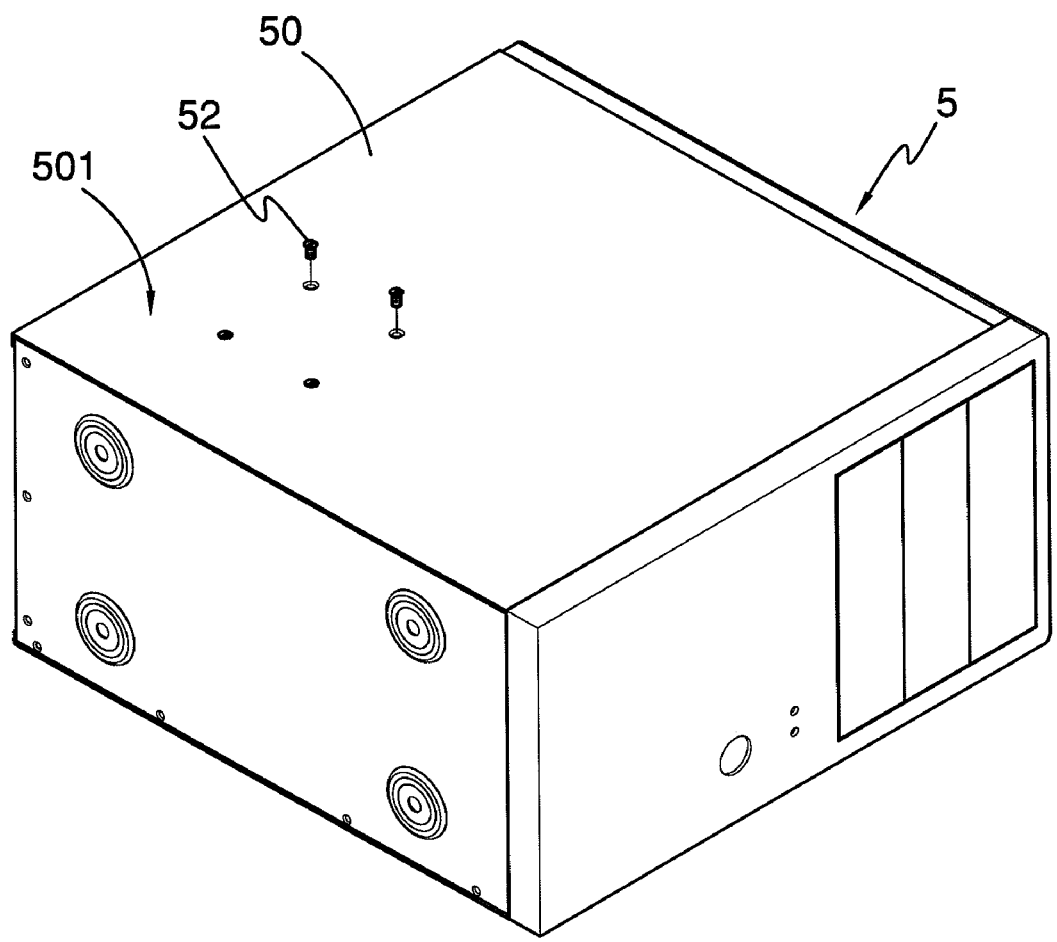
FIG. 1 is a perspective view of a casing in accordance with the preferred embodiment of the invention.

Referring now to FIGS. 1-4 of the drawings, a casing 5 is disclosed in accordance with the preferred embodiment of the invention. The casing 5 is adapted, but not limited to, a server, a personal computer, a notebook, a cell phone, an E-book, an electronic picture frame, etc. As shown in FIG. 1, the casing 5 includes a metallic sheet 50 and at least one screw 52.

Figure 2:
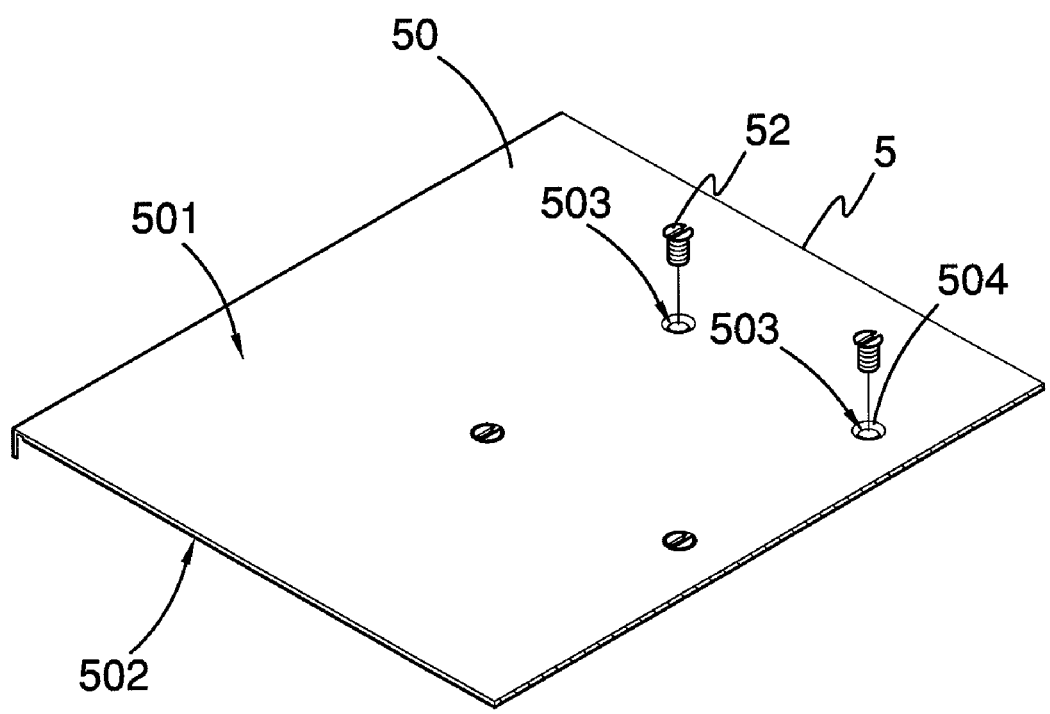
FIG. 2 is a partially enlarged perspective view of the casing in FIG. 1, showing a metallic sheet and screws of the casing.
Figure 3:
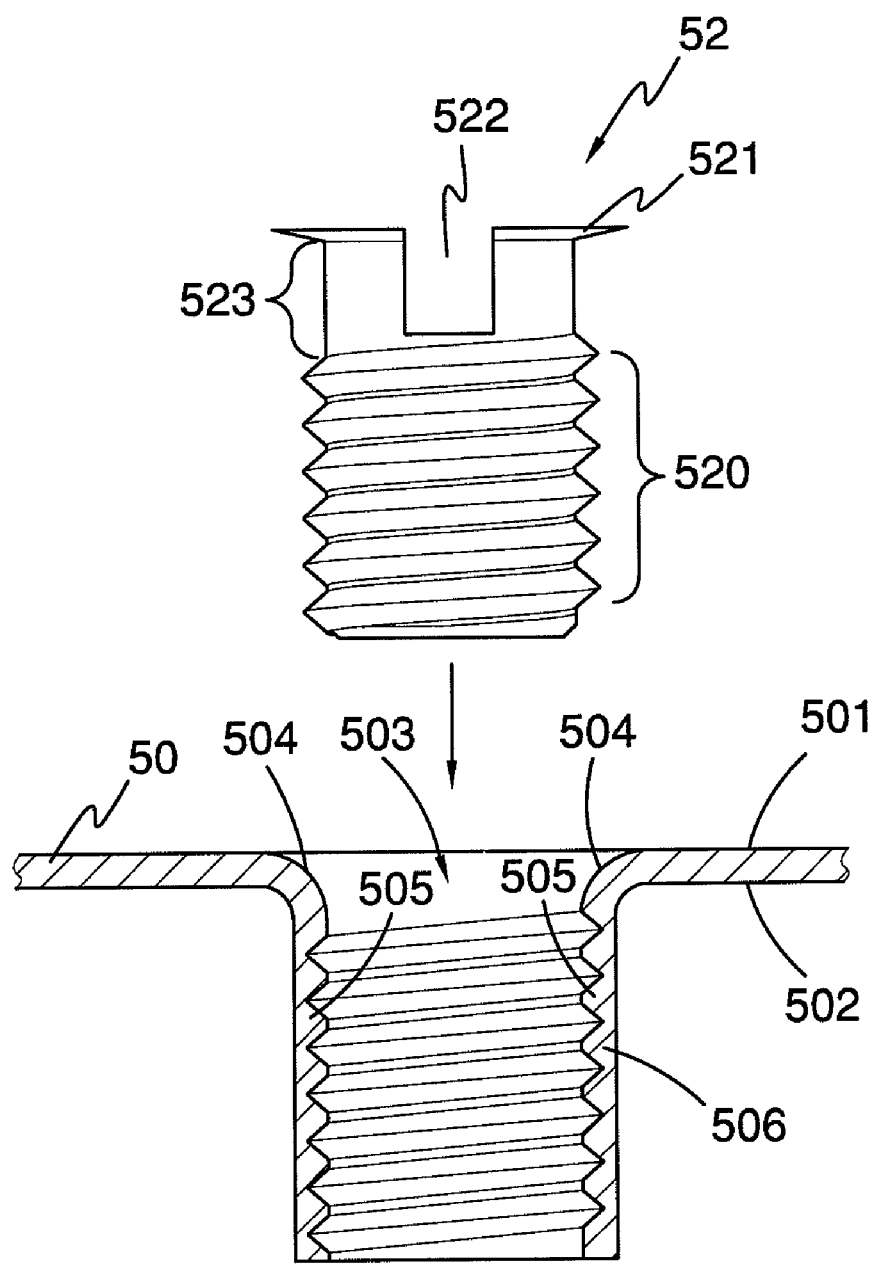
FIG. 3 is a partial, enlarged cross-sectional view of the screw and the metallic sheet before engagement.

As best seen in FIG. 2, the metallic sheet 50 of the casing 5 is formed with at least one extruded tapped hole 503 from top 501 through bottom 502. As shown in FIG. 3, the extruded tapped hole 503 is surrounded by an arcuate portion 504 in the metallic sheet 50 and a sleeve 506 integrally with and depending from the arcuate portion 504. The sleeve 506 extends beyond the bottom 502 of the metallic sheet 50 and is tapped to include internal threads 505.

Figure 5:
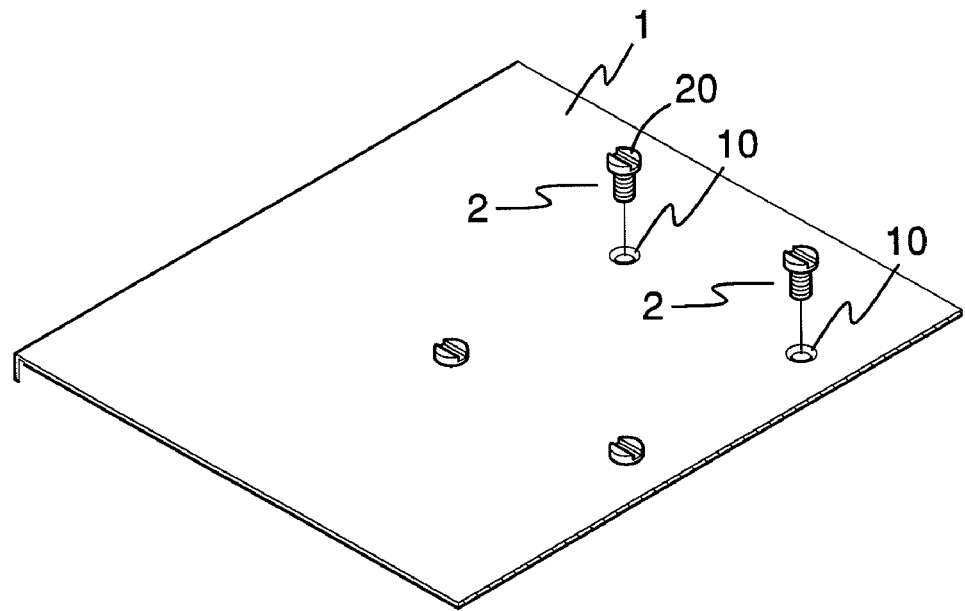
FIG. 5 illustrates a conventional screw to be received in an extruded tapped hole of a metallic sheet.
Figure 6:
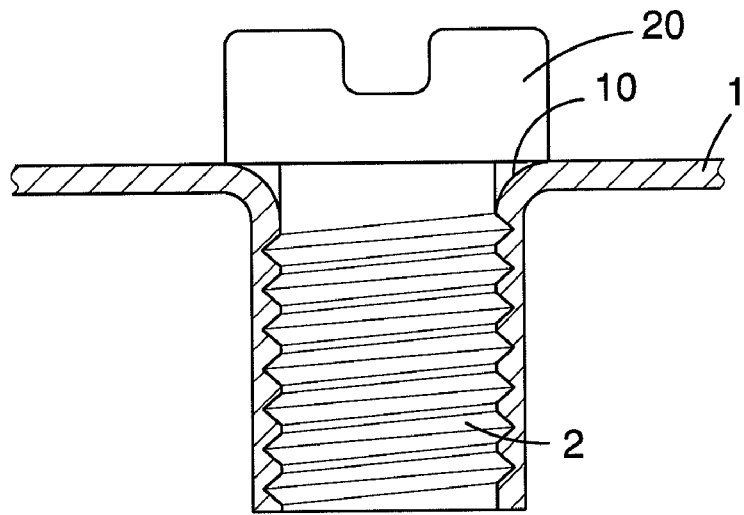
FIG. 6 is a partial, enlarged cross-sectional view of the prior art in FIG. 5, showing that the conventional screw and the metallic sheet are engaged.
Figure 7:
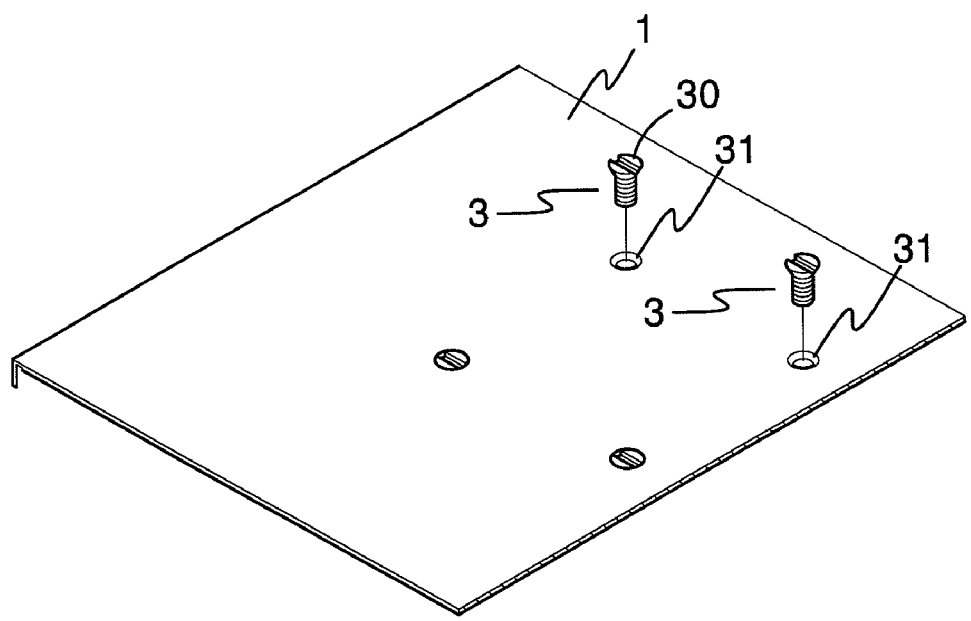
FIG. 7 illustrates a conventional countersink screw to be received in a countersink of a metallic sheet.
Figure 8:
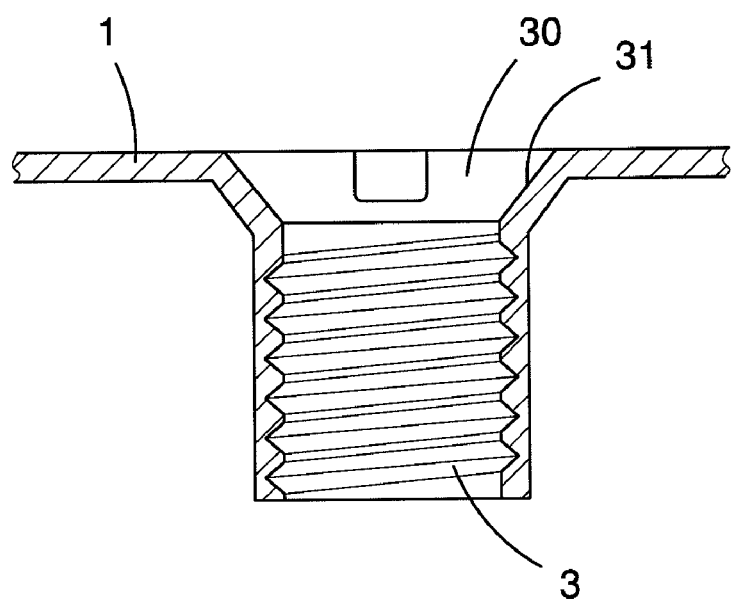
FIG. 8 is a partial, enlarged cross-sectional view of the prior art in FIG. 7, showing that the countersink screw and the metallic sheet are engaged.
Figure 9:
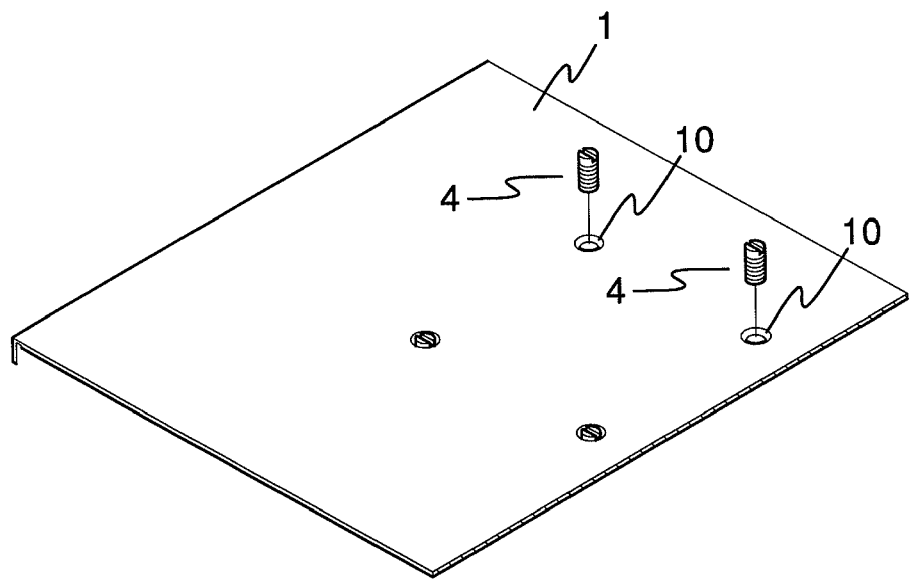
FIG. 9 illustrates a conventional grub screw to be received in an extruded tapped hole of a metallic sheet.
Figure 10:
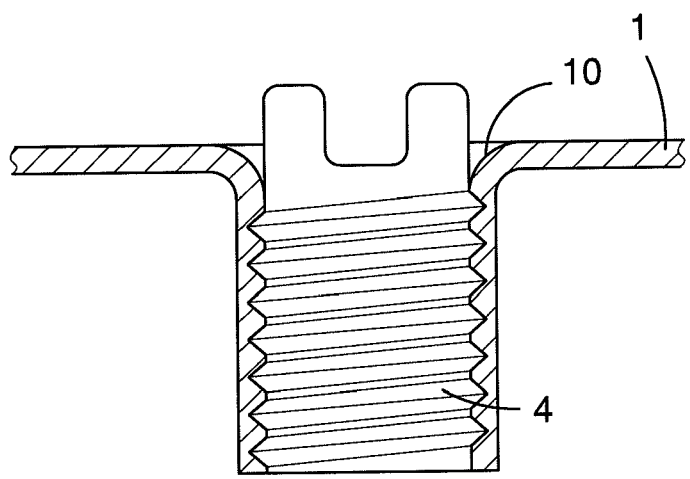
FIG. 10 is a partial, enlarged cross-sectional view of the prior art in FIG. 9, showing that the grub screw and the metallic sheet are engaged.

In practice, the extruded tapped hole 503 with the arcuate portion 504 and the sleeve 506 as described above is generally formed by a punching process of using a punch press to push a punch through the material and into a die to create a hole with a burr edge in the workpiece, namely the metallic sheet 50. The hole is then tapped to form internal threads in the burr which includes the arcuate portion 504 and the sleeve 506. Basically, the arcuate portion 504 in the metallic sheet 50 is created and shaped by a punch head of the punch during the punching process. In this regard, the extruded tapped hole 503 is commonly used as a reserved hole in a computer casing, however, to receive a conventional screw with undesired effect, as described in FIG. 5. Besides, in this embodiment, the extruded tapped hole 503 does not have to be further processed to form an upper conical enlarged part as in the countersink 31 of FIG. 7 or 8, by virtue of the screw 52, as will be explained later. Therefore, the casing 5 can be produced in a relatively cost-effective way.

Referring to FIG. 3, the screw 52 is configured to be fitted in the extruded tapped hole 503 of the metallic sheet 50 and has a threaded section 520, a flat head 521 and a neck 523 disposed between the threaded section 520 and the flat head 521. The neck 523 is unthreaded and is arranged in view of the depth of the extruded tapped hole 503. The threaded section 520 is configured to be mated with the internal threads 505 of the sleeve 506 of the metallic sheet 50. The flat head 521 has a diameter greater than that of the threaded section 520.

Furthermore, the screw 52 defines a recess 522 in a top surface of the flat head to receive a head of a screwdriver (not shown). In addition, the recess 522 of the screw 52 extends into the unthread neck 523, as shown in FIG. 3. The unthread neck 523 has a diameter smaller than that of the flat head 521. In this embodiment, the screw 52 has the slot-shaped recess 522 to be driven by a flat-bladed screwdriver (not shown). The recess 522 of the screw 52 may be, but not limited to, a single slot, as well as a cross-shaped recess and a hexagonal socket.

Figure 4:
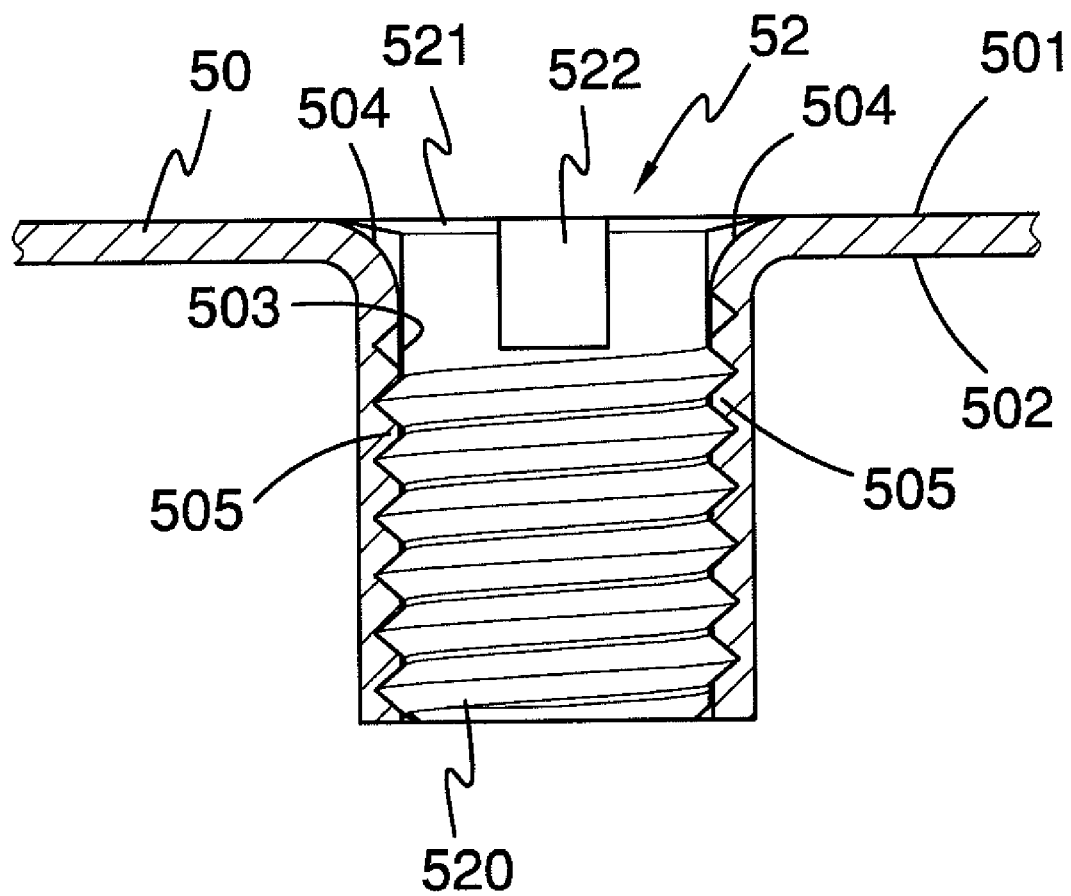
FIG. 4 is a view similar to FIG. 3, showing that the screw and the metallic sheet are engaged.

Furthermore, in this embodiment, the flat head 521 is, but not limited to, a thin metallic piece. As shown in FIG. 4, when the screw 52 is engaged in the extruded tapped hole 503, the top surface of the flat head 521 is flush with the top surface 501 of the metallic sheet 50 and a bottom periphery of the flat head 521 abuts on a top periphery of the arcuate portion 504. That is, the flat head 521 of the screw 52 is able to abut against the arcuate portion 504 and sit flush with the metallic sheet 50 when the screw 52 is placed in the extruded tapped hole 503 of the metallic sheet 50. In such a fashion, the flat head 521 prevents the whole screw 52 from being driven out of the extruded tapped hole 10 and fall from the metallic sheet 1 under excessive rotation by an electric tool, and thereby the screw 52 can be precisely positioned in the extruded tapped hole 10 and exactly seal the same without shortage found in the prior arts.

It will be appreciated that although a particular embodiment of the invention has been shown and described, modifications may be made. It is intended in the claims to cover such modifications which come within the spirit and scope of the invention.

The invention claimed is:

1. A casing, comprising:
   a metallic sheet formed with an extruded tapped hole surrounded by an arcuate portion in the metallic sheet and a sleeve integrally with and depending from the arcuate portion; the sleeve having internal threads; and
   a screw configured to be fitted in the extruded tapped hole of the metallic sheet and having a threaded section and a flat head; the threaded section configured to be mated with the internal threads of the sleeve of the metallic sheet; and the flat head being capable of abutting against the arcuate portion and sitting flush with the metallic sheet when the screw is placed in the extruded tapped hole of the metallic sheet.

2. The casing of claim 1, wherein the screw further comprising an unthread neck disposed between the flat head and the threaded section.

3. The casing of claim 2, wherein the screw defines a recess in a top surface of the flat head and the recess extends into the unthread neck of the screw.

4. A plate, comprising:
   a metallic sheet formed with an extruded tapped hole surrounded by an arcuate portion in the metallic sheet and a sleeve integrally with and depending from the arcuate portion; the sleeve having internal threads; and
   a screw configured to be fitted in the extruded tapped hole of the metallic sheet and having a threaded section and a flat head; the threaded section of the screw configured to be mated with the internal threads of the sleeve of the metallic sheet; the head of the screw being capable of abutting against the arcuate portion and sitting flush with the metallic sheet when the screw is placed in the extruded tapped hole of the metallic sheet.

5. The plate of claim 4, wherein the screw further comprising an unthread neck disposed between the flat head and the threaded section.

6. The plate of claim 5, wherein the screw defines a recess in a top surface of the flat head and the recess extends into the unthread neck of the screw.

* * * * *